United States Patent [19]

Schulze et al.

[11] 4,032,484

[45] June 28, 1977

[54] FIRE-RETARDANT POLYURETHANE COMPOSITION

[75] Inventors: Heinz Schulze; Howard P. Klein, both of Austin, Tex.

[73] Assignee: Texaco Development Corporation, New York, N.Y.

[22] Filed: Jan. 19, 1976

[21] Appl. No.: 650,393

[52] U.S. Cl. .................. 260/2.5 AJ; 260/2.5 AQ; 260/45.8 N; 260/77.5 SS

[51] Int. Cl.² .............. C08G 18/46; C08G 18/50; C08G 5/34

[58] Field of Search .............. 260/2.5 AJ, 2.5 AC, 260/45.8 N, 2.5 AQ, 77.5 SS

[56] References Cited

UNITED STATES PATENTS

| 3,003,977 | 10/1961 | Hurwitz | 260/2.5 AC |
|---|---|---|---|
| 3,152,094 | 10/1964 | Erner | 260/2.5 AC |
| 3,177,223 | 4/1965 | Erner | 260/2.5 AC |
| 3,448,065 | 6/1969 | Green | 260/2.5 AC |
| 3,728,291 | 4/1973 | Carroll | 260/2.5 AC |

FOREIGN PATENTS OR APPLICATIONS

| 2,172,770 | 11/1973 | France |
|---|---|---|
| 2,204,481 | 8/1973 | Germany |

*Primary Examiner*—C. Warren Ivy
*Attorney, Agent, or Firm*—Carl G. Ries; Thomas H. Whaley; James L. Bailey

[57] ABSTRACT

A fire-retardant polyurethane such as a polyurethane foam is produced by reacting an amino polyol with a polyisocyanate in the presence of 2,4,5-tribromoimidazole acting as a fire-retardant agent. The polyurethane foam thus formd is particularly useful for insulation purposes.

8 Claims, No Drawings

FIRE-RETARDANT POLYURETHANE COMPOSITION

BACKGROUND OF THE INVENTION

1. Field of the Invention

This invention pertains to the field of polyurethanes. More particularly, this invention relates to the preparation and use of fire-retardant polyurethanes such as polyurethane foams which are made utilizing 2,4,5-tribromoimidazole as a fire-retardant chemical.

2. Description of the Prior Art

It has become increasingly important to impart flame-resistance properties to polyurethane plastics. This is particularly true where cellular polyurethanes are used, for example, as insulation to prevent the risk of fire in the daily use of many items. Numerous methods are known for imparting fire-resistant properties to polyurethane plastics. For example, in the production of the cellular polyurethanes, one may use halogenated compounds or derivatives of acid phosphorus as the active hydrogen-containing component and thus impart flame-resistance. It is also possible to use compounds containing antimony or boron.

While many halogen-containing compounds such as bromine-containing additives have been proposed as chemicals to promote fire-retardance, in many instances such proposed materials are deficient in one or more respects. For example, use of such fire-retardant chemicals sometimes materially adversely affects the properties of the resultant polyurethane, and particularly polyurethane foam. Thus, for example, use of such additives may in many instances adversely affect compressive and tensile strengths, lead to poor (high) K factors, and undesirable low percentage of closed cells, deleteriously affect dimensional stability, etc. Still other bromine-containing fire-retardant additives do not have a sufficiently high bromine content whereby an unduly large amount of the additive must be used to achieve the desired effectiveness. This is a particularly penalizing drawback if the additive is non-functional, that is, does not react with the isocyanate. In still further instances, the halogenated compound does not have a sufficiently high stability at conventional use temperatures, does not properly decompose on burning, has an insufficiently low volatility, etc.

It would, therefore, be a substantial advance in the art if use of a fire-retardant chemical for polyurethane compositions could be discovered which does not materially affect the final properties of the polyurethane composition, and yet imparts a sufficiently adequate fire-retardance property to the polyurethane.

SUMMARY OF THE INVENTION

It has now been found that 2,4,5-tribromoimidazole is a useful fire-retardant agent when incorporated into a polyurethane composition such as a polyurethane foam. The polyurethane materials while possessing the requisite fire-retardancy property, still possess other desirable properties normally sought and achieved in conventional polyurethanes.

DESCRIPTION OF THE PREFERRED EMBODIMENTS

The 2,4,5-tribromoimidazole chemical employed here to achieve fire-retardance in polyurethanes is a known compound, and may be synthesized via a number of techniques. For example, imidazole itself may be brominated to realize the tribromo-substituted compound.

The amount of tribromoimidazole used in the polyurethane composition will usually depend upon the degree of fire-retardance that is sought in the polyurethane such as the polyurethane foam being prepared. Usually the final polyurethane composition will contain from about 1 to about 15 percent by weight of tribromoimidazole fire-retardant chemical based on total weight of the polyurethane material.

The tribromoimidazole may be used to provide fire-retardant polyurethane compositions useful in the preparation of foams, adhesives, binders, laminates, coatings, etc. Preferred polyurethanes are polyurethane foams used for insulation purposes.

It has been noted that while the tribromoimidazole imparts flame-resistance or fire-retardance properties to polyurethanes, it nevertheless does not adversely affect other sought-after properties such as proper density, K factor, compressive and tensile strengths, heat distortion, percent closed cells, skin and cell appearance, dimensional stability, etc. Moreover, the tribromoimidazole itself has a high stability at conventional use temperatures, low volatility and properly decomposes upon burning. In addition, the tribromoimidazole has a relatively high bromine content and therefore one need not use an unduly large amount of the additive to achieve the sought-after fire-retardancy.

As noted above, the polyurethane products are prepared by the reaction of an amino polyether polyol or an amino polyester polyol with an organic polyisocyanate. Other additional components may also be present such as chain extending agents, catalysts, surface active agents, foam stabilizers, blowing agents, fillers, and pigments.

The organic polyisocyanates useful in the production of polyurethanes are well known and are a matter of selection by those skilled in the polyurethane art. Examples of such organic polyisocyanates include aromatic or aliphatic polyisocyanates such as diphenyl-4,4,'-triisocyanate, 3,3'-dichloro-4,4-diphenyldiisocyanate, 1,4-tetramethylene diisocyanate, meta- and para-phenylenediisocyanate, xylene-1,4-diisocyanate, 2,4- and 2,6-toluene diisocyanates, diphenylmethane diisocyanate, paraisocyanatobenzenyl isocyanate, etc. and mixtures thereof.

Preferred organic polyisocyanates are the polyfunctional polyaryl isocyanates. The polyaryl isocyanates are produced by the phosgenation of the reaction product of aniline and formaldehyde. Such reactions are well known and are described in U.S. Pat. Nos. 2,683,730; 3,227,173; 3,344,162; and 3,362,797, for example. The polyaryl isocyanates thus formed have functionalities greater than two which can be varied up to the higher functionality materials. In practice, however, functionalities greater than four are attained only with difficulty. However, for the purpose of practicing this invention, materials with a functionality as high as five may be used. It is preferred that the functionality be from two to about four.

The hydroxyl-containing polyol component which additionally contains an amino function which is reacted with the isocyanate may suitably be an amino polyester polyol or an amino polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from about 350 to 700. Semi-rigid foams of a desired flexibility are provided when the hydroxyl number is intermediate to the ranges just given.

It has been found that it is necessary that the polyether or polyester polyol also contain primary, secondary and/or tertiary amino groups in order that the fire-retardant component achieve its function. When neutral polyols are employed along with the tribromoimidazole no fire-retardancy property is found in the final polyurethane foam.

A wide variety of amino polyols may be used here. There may be made for example, by first preparing the below described polyester or polyether polyols and then aminating them by various schemes, or by somehow incorporating the amino function in the polyol as part of the initial reaction in preparing said amino polyols.

When the amino polyol is a polyester, it is preferable to use, as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids, the phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc., may be employed. The alcohol component for the polyester should preferably contain a plurality of hydroxyl groups and is preferably an aliphatic alcohol, such as ethylene glycol, propylene glycol, dipropylene glycol, diethylene glycol, glycerol, pentaerthyritol, trimethylolethane, trimethylolpropane, mannitol, sorbitol, polyglucosides, etc. Mixtures of two or more of the above-identified alcohols may be employed also if desired. When a flexible urethane foam is desired, the polyol should preferably have an average functionality of from about two to about four. For rigid foams, the functionality of the polyol component is preferably four or more (e.g., five to seven).

When the hydroxyl-containing component is an amino polyether polyol, particularly useful in making flexible polyurethane foam, the polyol may be an alkylene oxide adduct of a polyhydric alcohol with a functionality of from about two to about four. The alkylene oxide may suitably be ethylene oxide, propylene oxide, or 1,2-butylene oxide, 1,4-butylene oxide or a mixture of some or all of these. The polyol will suitably have a molecular weight within the range of from about 500 to about 7,000. For flexible polyether polyurethane foams, the alkylene oxide is preferably propylene oxide or a mixture of propylene oxide and ethylene oxide and the molecular weight is preferably within the range of about 2,000 to 4,000.

For rigid polyether polyurethane foams, the polyol should have a functionality of four or more (e.g., five to seven) and a molecular weight of from about 300 to about 1,000. Polyols for rigid polyether polyurethane foams may be made in various ways including the addition of an alkylene oxide as above to a polyhydric alcohol with a functionality of from four to seven. These polyols may also be, for example, Mannich condensation products of a phenol, an alkanolamine, and formaldehyde which Mannich condensation product is then reacted with an alkylene oxide. See U.S. Pat. No. 3,297,597.

Specific examples of amino polyols which may be usefully employed here may be provided from many sources. For example, a polyol may be an oxyalkylated reaction product of a 1,2-epoxide with various amino compounds. Thus, for example, such epoxides as ethylene oxide and propylene oxide may be reacted with monoethanolamine, diethanolamine, triethanolamine, ethylenediamine, diethylenetriamine, triethylenetetramine, and tetraethylenepentamine. See, for example, U.S. Pat. No. 3,470,118.

Yet another specific amino polyol source is one prepared by reacting a co-initiator such as sucrose or sorbitol with triethanolamine, which co-initiator is then propoxylated. See, for example, U.S. Pat. No. 3,332,934.

Another class of amino polyols which may be used here are those set out in U.S. Pat. No. 3,493,525. These amino polyols are aromatic polyamines containing a single molecule of an alkylene oxide for each hydrogen atom of the amino group which has been replaced. The amino polyols are specifically made by condensing an aromatic polyamine such as tolylenediamine or a polyaryl alkylene polyamine with propylene oxide.

A still further useful amino polyol is one formed by oxyalkylating a polyamino-1,3,5-triazine. As an example of this, see U.S. Pat. No. 3,399,151.

Thus, as can be seen from the above, diverse amino polyols may be used in the practice of the invention here.

The amount of hydroxyl-containing amino polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 1.05 to about 1.5 mol equivalents of isocyanato groups per mol equivalent of hydroxyl groups.

It is within the scope of the present invention to utilize an extraneously added inert blowing agent such as a gas or gas-producing material. For example, halogenated low-boiling hydrocarbons, such as trichloromonofluoromethane, methylene chloride, carbon dioxide, nitrogen, natural gas, etc., may be used. The inert blowing agent reduces the amount of excess isocyanate and water that is required in preparing flexible urethane foam. For a rigid foam, it is preferably to avoid the use of water and to use exclusively the extraneous blowing agent. Selection of the proper blowing agent is well within the knowledge of those skilled in the art. See, for example, U.S. Pat. No. 3,072,082.

When water is used, the amount of water, based on the hydroxyl compound, is suitably within the range of about 0.05 to about 0.25 mol per mol equivalent of hydroxy compound.

A catalyst is also utilized in forming the polyurethane compositions. Such catalyst which may be present in an amount ranging from about 0.1 percent to about 6 percent, based on the combined weight of the amino polyol and polyisocyanate, may be chosen from a wide variety of materials. Thus, tertiary amines may be used, such as alkylamine, (e.g. triethylamine), heterocyclic amines, such as N-alkylmorpholines (e.g., N-methylmorpholine, N-ethylmorpholine, etc.), 1,4-dimethylpiperazine, triethylenediamine, 2-methyl-triethylenediamine, etc., aliphatic polyamines, such as N,N,N',N'-tetramethyl-1,3-butanediamine and others. Also, organo metallic compounds such as organic tin compounds may be used such as, for example, stannous octoate, stannous oleate, stannous laurate, dibutyltin di-2-ethylhexoate, dibutyltin dibutoxide, and dibutyltin dilaurate. The corresponding lead, zinc, and iron compounds have also been suggested for this use.

Conventional formulation ingredients are also employed, such as, for example, foam stabilizers also known as silicone oils or emulsifiers. The foam stabilizers may be an organic silane or siloxane. For example, compounds may be used having the formula:

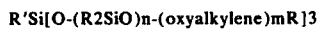

R'Si[O-(R2SiO)n-(oxyalkylene)mR]3 wherein R is an alkyl group containing from one to four carbon atoms; n is an integer of four to eight; m is an integer of 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide the foam by a one-step process. In this instance, water should comprise at least a part (e.g., 10% to 100%) of the blowing agent. The foregoing methods are known to those skilled in the art, as evidenced by the following publication: duPont Foam Bulletin, "Evaluation of Some Polyols in One-Shot Resilient Foams", March 22, 1960.

Another foam method which can be used is the "quasi-prepolymer method". This can be used along with the one-shot process to make rigid foams. In accordance with the quasi-prepolymer method, a portion of the hydroxy-containing is reacted in the absence of a catalyst with the polyisocyanate component in proportions so as to provide from about 20% to about 40% of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, etc. The blowing agent (e.g., a halogenated lower aliphatic hydrocarbon), the foam-stabilizing agent, etc., may be added to either the prepolymer or remaining polyol, or both, prior to the mixing of the component, whereby at the end of the reaction of a rigid polyurethane foam is provided.

Along with the fire-retardant tribromoimidazole, of the present invention, conventional fire-retardants may also be employed in the preparation of the polyurethane compositions here. The conventional fire-retardants may be of two types. The first of these are those that are incorporated by mere mechanical mixing and include, for example, tris (chloroethyl) phosphate, tris (2,3-dibromopropyl) phosphate, diammonium phosphate, other halogenated compounds and antimony oxide. The second type of fire-retardants are those that become chemically bound in the polymer chain. An example of this type of fire-retardant includes chlorendic acid derivatives.

The invention will be illustrated further with respect to the following specific examples, which are given by way of illustration and are not to be construed as limitations upon the scope of this invention.

EXAMPLE I

Here two polyurethane foams were prepared, one with 2,4,5-tribromoimidazole and the other without benefit of fire-retardant additive. As can be seen from Table I below, Foam B containing the tribromoimidazole had a substantially less burn rate than Foam A prepared without benefit of such chemical. Also, the properties of Foam B containing the imidazole fire-retardant additive were acceptable and fell within established limits of acceptability and fell within all instances. The particular amino polyol utilized had a hydroxyl number of 454 and a molecular weight of 650 and was prepared as a Mannich pentol condensate made by reacting one mole of nonylphenol with two moles of diethanolamine and two moles of formaldehyde, which pentol is then propoxylated according to the procedure set out in U.S. Pat. No. 3,297,597.

Table I below lists the composition makeup of Foams A and B and properties of the prepared polyurethane foam.

TABLE I

| FORMULATION (Parts By Wt.) | Foam A | Foam B |
|---|---|---|
| Polyol (OH No. 454) | 40.4 | 35.7 |
| Tribromoimidazole | — | 10.0 |
| Silicone | 0.5 | 0.5 |
| Freon | 13.0 | 13.0 |
| Isocyanate (PAPI) Index = 1.05 | 46.0 | 40.8 |
| FOAM PROPERTIES | | |
| Cream Time (sec.) | 25 | 10 |
| Tack Free Time (sec.) | 70 | 44 |
| Rise Time (sec.) | 102 | 70 |
| Skin Appearance | Good | Excellent |
| Cell Appearance | Good | Excellent |
| Initial Surface Friability | None | None |
| Friability Test (% Wt. Loss) | 13 | 0 |
| Butler Chimney Test (flame ht.) (in.) | — | 8.5 |
| Butler Chimney Test (sec. to ext.) | — | 10.63" |
| Butler Chimney Test % wt. retained | — | 79 |
| ASTM-1692-Burns (in./sec.) (BHA) | 3.3"/60 sec. | 0.96"/29.8 sec. |
| ASTM-1692-Burns (in./sec.) (AHA) | — | 0.86"/31.2 sec. |
| Density (lb./ft.³) | 2.10 | 1.86 |
| K-Factor | 0.116 | 0.108 |
| Compressive Strength (w rise) psi. | 45.81 | 34.40 |
| Compressive Strength (x rise) psi | 17.71 | 13.83 |
| Tensile Strength (psi) | 50 | 45.93 |
| Heat Distortion (° C.) | 157 | 136 |
| % Closed Cells | 94.24 | 95.02 |

| Dimensional Stability | ΔV | ΔW | ΔL | ΔV | 66 W | ΔL |
|---|---|---|---|---|---|---|
| 158° F., 100% RH, 1 wk. | +7.1 | −0.2 | +4.0 | +9.2 | −0.6 | +5.0 |
| 180° F., Dry, 1 wk. | +2.8 | −0.6 | +2.2 | +3.0 | 0 | +2.5 |
| −20° F., Dry, 1 wk. | −2.8 | +0.7 | −1.7 | −3.0 | +0.1 | −1.5 |

From the foregoing description and examples of this invention, those of ordinary skill in the art may make many modifications and variations therefrom without departing from the scope of the invention as hereinafter claimed.

We claim:

1. A fire-retardant polyurethane which is the reaction product of an amino polyether polyol or an amino polyester polyol and an organic polyisocyanate formed in the presence of 2,4,5-tribromoimidazole as a fire-retardant chemical.

2. The polyurethane of claim 1 which is in a foam form having been prepared by reacting said amino polyol and said polyisocyanate in presence of a blowing agent.

3. The polyurethane of claim 1 which is comprised of 1–15 percent by weight of said tribromoimidazole based on the total weight of said polyurethane.

4. The polyurethane foam of claim 2 which is comprised of 1–15 percent by weight of said tribromoimidazole based on the total weight of said polyurethane foam.

5. A method of preparing a fire-retardant polyurethane which comprises mixing and reacting an amino polyether polyol or an amino polyester polyol and an organic polyisocyanate in presence of 2,4,5-tribromoimidazole as a fire-retardant chemical.

6. The method of claim 5 wherein said polyurethane is a polyurethane foam prepared by reacting said amino polyol and said polyisocyanate in presence of a blowing agent.

7. The method of claim 5 wherein said polyurethane is formed in presence of 1–15 percent by weight of said tribromoimidazole based on the total weight of said polyurethane.

8. The method of claim 6 wherein said polyurethane foam is formed in the presence of 1–15 percent by weight of said tribromoimidazole based on the total weight of said polyurethane foam.

* * * * *